J. McROBERTS.
FISH-TRAP.

No. 178,375.

Patented June 6, 1876.

WITNESSES:
E. Wolff
John Goethals

INVENTOR:
James McRoberts
BY
ATTORNEYS.

UNITED STATES PATENT OFFICE.

JAMES McROBERTS, OF TOLEDO, IOWA.

IMPROVEMENT IN FISH-TRAPS.

Specification forming part of Letters Patent No. 178,375, dated June 6, 1876; application filed April 18, 1876.

*To all whom it may concern:*

Figure 1:
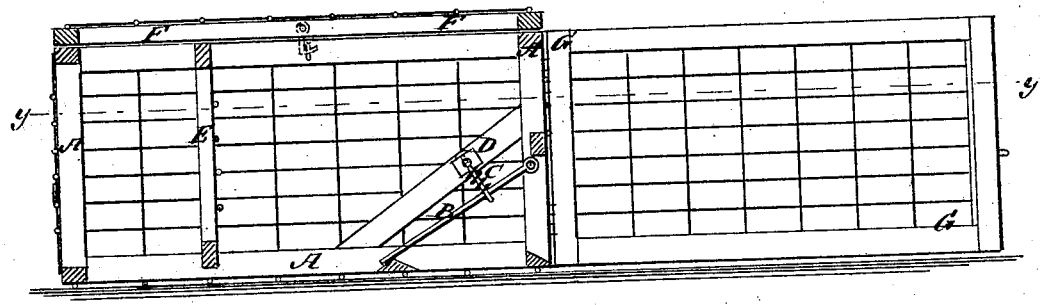
Figure 2:
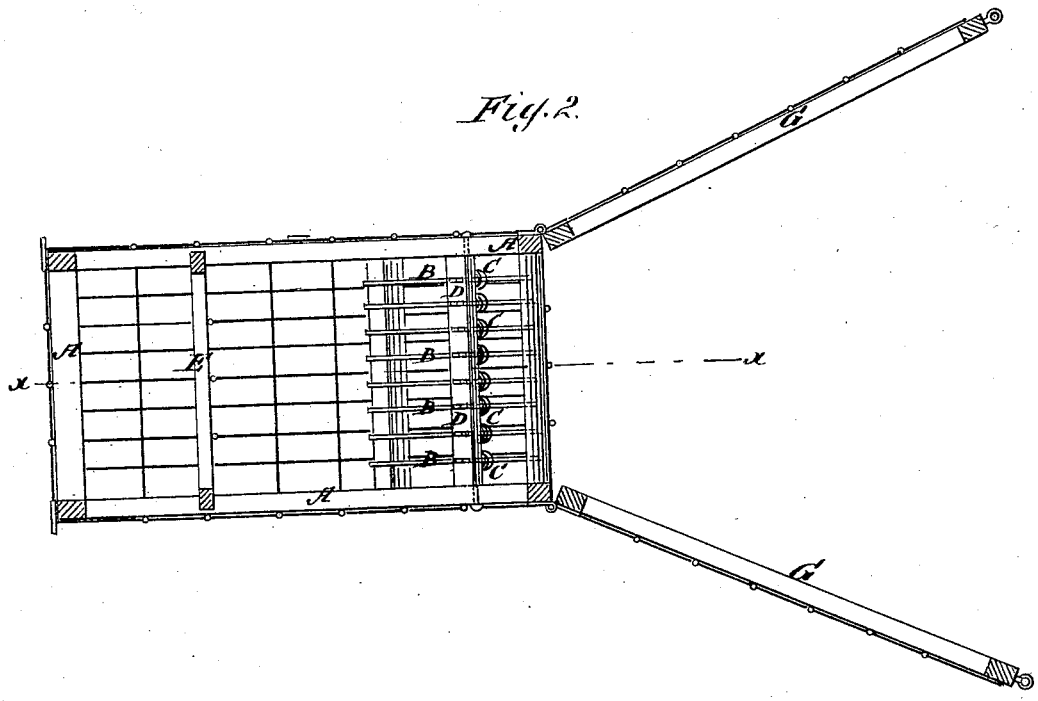

Be it known that I, JAMES McROBERTS, of the town of Toledo, county of Tama, and State of Iowa, have invented a new and Improved Fish-Trap, of which the following is a specification:

Figure 1 is a vertical longitudinal section of my improved fish trap, taken through the line X X, Fig. 2; and Fig. 2 is a horizontal longitudinal section of the same, taken through the line Y Y, Fig. 1.

The object of this invention is to furnish an improved trap for catching fish at the outlets of lakes and ponds, and in other places, which shall be so constructed as to prevent the escape of the fish within the trap when another fish is entering, and which will prevent the smaller fish from being destroyed by the larger ones.

My invention consists in the combination of the independent teeth, the springs, and the pivoted cross-bar with the opening in the end of the trap; in the combination, with the trap, of the cross-partition, having its wire-netting made with a larger mesh than the rest of the trap; and in the combination of the hinged wings with the end of the trap in which the inlet-opening is formed, as hereinafter fully described.

The bottom, sides, one end, and the upper part of the other end of the box A are formed by attaching wire net-work, of a suitable sized mesh, to a wooden frame, so as to make the trap strong and durable. The lower part of one end is left open, and within the trap at said end are placed a number of teeth, B, the upper ends of which are hinged to a bar of the frame at the top of the inlet-opening. The lower ends of the teeth B rest upon a cross-bar of the bottom of the box A. With the upper parts of the teeth B are connected the ends of springs C, the other ends of which are connected with a cross-bar, D, and which are kept in place by guide-pins. The ends of the cross-bar D are pivoted to bars of the side frames of the box A, or to bars attached to said side frames, so that by adjusting the said bar D the springs C may be made to work harder or easier, as may be desired.

Each of the teeth B works independently of the others, so that a fish on entering will raise one or more teeth, B, according to his size, and will open no space for the fish already in the trap to escape at the sides of the said entering fish.

E is a cross-partition, secured to the box A, and formed by attaching to a wooden frame wire-netting of a larger mesh than the netting of the box A, so that the smaller fish may pass through into a smaller compartment, and may thus be protected from the larger fish.

The top F of the trap is formed by attaching a wire-netting to a wooden frame, is hinged at one edge to one side of the box, and is fastened to the other side by a hook or other convenient fastening. G are two wings, of any desired length, formed by attaching wire-netting to wooden frames, and hinged at their ends to the side edges of the open end, to guide the fish into the trap.

Having thus described my invention, what I claim as new, and desire to secure by Letters Patent, is—

1. The combination of the independent teeth B, the springs C, and the pivoted cross-bar D with the opening in the end of the trap A F, substantially as herein shown and described.

2. The combination, with the trap A F, of the cross-partition E, having its wire-netting made with a larger mesh than the rest of the trap, substantially as herein shown and described.

3. The combination of the hinged wings G with the end of the trap A F in which the inlet-opening is formed, substantially as herein shown and described.

JAMES McROBERTS.

Witnesses:
J. W. McROBERTS,
A. C. NEVINS.